(12) United States Patent
Breitling

(10) Patent No.: US 8,799,293 B2
(45) Date of Patent: Aug. 5, 2014

(54) SYSTEM AND METHOD FOR EFFICIENT STORAGE DESTINATION DETERMINATION IN A STORAGE FACILITY

(75) Inventor: Harald Breitling, Bad Schoenborn (DE)

(73) Assignee: SAP Aktiengesellschaft, Walldorf (DE)

( * ) Notice: Subject to any disclaimer, the term of this patent is extended or adjusted under 35 U.S.C. 154(b) by 2468 days.

(21) Appl. No.: 11/250,990

(22) Filed: Oct. 13, 2005

(65) Prior Publication Data

US 2007/0094101 A1 Apr. 26, 2007

(51) Int. Cl.
*G06F 7/00* (2006.01)
*G06F 17/30* (2006.01)
*G06Q 10/08* (2012.01)
*G06Q 10/00* (2012.01)

(52) U.S. Cl.
CPC ............ *G06Q 10/08* (2013.01); *G06Q 10/087* (2013.01)
USPC ........................................... 707/748; 705/28

(58) Field of Classification Search
CPC ............................. G06Q 10/08; G06Q 10/087
USPC .................... 707/5, 736, 748, 758; 705/28
See application file for complete search history.

(56) References Cited

U.S. PATENT DOCUMENTS

| | | | | |
|---|---|---|---|---|
| 2,262,778 A * | 11/1941 | Schneider | ........................ | 374/53 |
| 5,031,124 A * | 7/1991 | Bosinoff et al. | ............... | 702/186 |
| 5,128,861 A * | 7/1992 | Kagami et al. | ................... | 705/10 |
| 5,765,143 A * | 6/1998 | Sheldon et al. | ................. | 705/28 |
| 6,895,485 B1 * | 5/2005 | DeKoning et al. | ............. | 711/170 |
| 7,325,041 B2 * | 1/2008 | Hara et al. | ..................... | 709/218 |
| 2001/0014868 A1 * | 8/2001 | Herz et al. | ..................... | 705/14 |
| 2002/0004764 A1 * | 1/2002 | Stolze et al. | .................... | 705/27 |
| 2002/0023046 A1 * | 2/2002 | Callahan et al. | ................ | 705/37 |
| 2002/0065750 A1 * | 5/2002 | Tanaka | .............................. | 705/28 |
| 2003/0110102 A1 * | 6/2003 | Chien et al. | ..................... | 705/28 |
| 2003/0171962 A1 * | 9/2003 | Hirth et al. | ......................... | 705/7 |
| 2004/0098288 A1 * | 5/2004 | Minakuchi | ......................... | 705/7 |
| 2004/0249723 A1 * | 12/2004 | Mayer | ............................. | 705/26 |
| 2006/0015529 A1 * | 1/2006 | Yagawa | ....................... | 707/104.1 |
| 2006/0209094 A1 * | 9/2006 | Usuda | ............................ | 345/684 |
| 2006/0294167 A1 * | 12/2006 | Borman et al. | ............... | 707/206 |
| 2008/0140581 A1 * | 6/2008 | Mayer | .............................. | 705/80 |
| 2009/0043617 A1 * | 2/2009 | Thomas | ............................ | 705/7 |

* cited by examiner

*Primary Examiner* — Jacob F Bétit
*Assistant Examiner* — Griselle Roland
(74) *Attorney, Agent, or Firm* — Blakely Sokoloff Taylor & Zafman LLP

(57) ABSTRACT

A system and method to improve storage efficiency in a warehouse. Storage combinations are assigned a ranking base on the distance from optimal storage. After sorting the data structure base on the ranking a best available storage combination can be identified by iterating the table in a rank order. In one embodiment, the ranking is used to identify candidates for rearrangement. By comparing the best available ranking with the current ranking, greater differences reflect greater benefit of rearrangement.

13 Claims, 8 Drawing Sheets

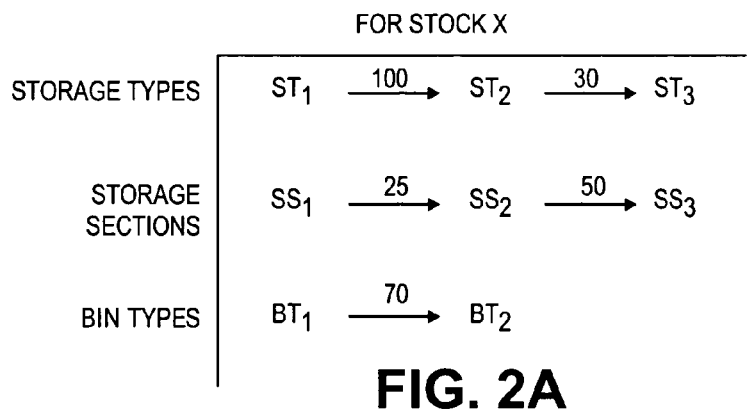

FIG. 2A

| ST₁ | SS₁ | BT₁ | 0 |
| ST₁ | SS₂ | BT₁ | 25 |
| ST₁ | SS₃ | BT₁ | 75 |
| ST₂ | SS₁ | BT₁ | 100 |
| ST₂ | SS₂ | BT₁ | 125 |
| ST₂ | SS₃ | BT₁ | 175 |
| ST₃ | SS₁ | BT₁ | 130 |
| ST₃ | SS₂ | BT₁ | 155 |
| ST₃ | SS₃ | BT₁ | 205 |
| ST₁ | SS₁ | BT₂ | 70 |
| ST₁ | SS₂ | BT₂ | 95 |
| ST₁ | SS₃ | BT₂ | 145 |
| ST₂ | SS₁ | BT₂ | 170 |
| ST₂ | SS₂ | BT₂ | 195 |
| ST₂ | SS₃ | BT₂ | 245 |
| ST₃ | SS₁ | BT₂ | 200 |
| ST₃ | SS₂ | BT₂ | 225 |
| ST₃ | SS₃ | BT₂ | 275 |

FIG. 2B

| ST₁ | SS₁ | BT₁ | 0 |
| ST₁ | SS₂ | BT₁ | 25 |
| ST₁ | SS₁ | BT₂ | 70 |
| ST₁ | SS₃ | BT₁ | 75 |
| ST₁ | SS₂ | BT₂ | 95 |
| ST₂ | SS₁ | BT₁ | 100 |
| ST₂ | SS₂ | BT₁ | 125 |
| ST₃ | SS₁ | BT₁ | 130 |
| ST₁ | SS₃ | BT₂ | 145 |
| ST₃ | SS₂ | BT₁ | 155 |
| ST₂ | SS₁ | BT₂ | 170 |
| ST₂ | SS₃ | BT₁ | 175 |
| ST₂ | SS₂ | BT₂ | 195 |
| ST₃ | SS₁ | BT₂ | 200 |
| ST₃ | SS₃ | BT₁ | 205 |
| ST₃ | SS₂ | BT₂ | 225 |
| ST₂ | SS₃ | BT₂ | 245 |
| ST₃ | SS₃ | BT₂ | 275 |

FIG. 2C

Storage Type sequence

| ST$_1$ | ST$_2$ | ST$_3$ |
|---|---|---|
| 0 | 7 | 5 |

| storage type |
|---|
| Ranking |

Storage Section sequence

| ST$_1$ | SS$_1$ | SS$_2$ | SS$_3$ |
|---|---|---|---|
|  | 0 | 2 | 3 |
| ST$_2$ | SS$_1$ | SS$_2$ | SS$_3$ |
|  | 0 | 4 | 1 |
| ST$_3$ | SS$_1$ | SS$_2$ | SS$_3$ |
|  | 0 | 8 | 9 |

| storage section |
|---|
| storage index |
| storage section |
| Ranking |
| storage section |
| Ranking |

Bin Type sequence

| ST$_1$ | BT$_1$ | BT$_2$ | BT$_3$ |
|---|---|---|---|
|  | 0 | 5 | 10 |
| ST$_2$ | BT$_1$ | BT$_2$ | BT$_3$ |
|  | 0 | 2 | 2 |
| ST$_3$ | BT$_1$ | BT$_2$ | BT$_3$ |
|  | 0 | 1 | 4 |

| storage bin |
|---|
| Ranking |
| storage bin |
| Ranking |
| storage bin |
| Ranking |

Storage Bin B-001
storage type ST$_3$
storage section SS$_2$
bin type BT$_2$

Ranking storage type    12
Ranking storage section  8
Ranking bin type         1
overall Ranking         21 optimal Storage Bin
optimal storage type    ST$_1$
optimal storage section SS$_1$
optimal bin type        BT$_1$

FIG. 3B

SYSTEM AND METHOD FOR EFFICIENT STORAGE DESTINATION DETERMINATION IN A STORAGE FACILITY

BACKGROUND OF THE INVENTION

1. Field

Embodiments of the invention are related to warehouse management. More specifically, embodiments of the invention relate to identification of a suitable storage bin in connection with a stock movement in a storage facility.

2. Background

In warehouse management, it is required to identify a destination storage location or bin for stock coming into the warehouse. A storage bin or storage location is defined by a number of constituents that make up a storage combination. Commonly, a storage combination includes a storage type, a storage section, and a bin type. A "storage type" is a physical or logical division of a complex warehouse distinguished by the warehouse procedures used or its organizational form or function. A "storage section" is a logical and physical division of a storage type. "Bin type" identifies the dimensions and characteristics of a bin, where a bin is the smallest unit of separable storage space in a warehouse. Storage bins with same dimensions and characteristics may be grouped into one bin type. Typically, to identify a destination bin, the availability of an optimal combination is first checked. However, if no optimal combination is available, the system iterates other combinations until an available storage location is found. Typically, this iteration occurs by iterating bin types then storage sections then storage types. With three constituents (A, B & C), the number of alternatives is A×B×C. The regular necessity to reiterate deeper into the possible alternatives and the large volume of transactions occurring in complex warehouses, results in a significant processing burden to identify a storage bin. Moreover, in the event that an optimal bin is not available, such systems fail to reliably put away stock into the best available bin as opposed to the first bin found to be available.

SUMMARY OF THE INVENTION

A system and method to improve storage efficiency in a warehouse is disclosed. Storage combinations are assigned a ranking base on the distance from optimal storage. After sorting the data structure base on the ranking a best available storage combination can be identified by iterating the table in a rank order. In one embodiment, the ranking is used to identify candidates for rearrangement. By comparing the best available ranking with the current ranking, greater differences reflect greater benefit of rearrangement.

BRIEF DESCRIPTION OF DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIGS. 2A-2C show an example of generation of a sorted data structure of storage combinations with a rank assigned.

FIG. 3B is an example of calculation of a stock ranking using persistent tables that may be stored in a database of one embodiment of the invention.

DETAILED DESCRIPTION

Warehouse processes necessitate the selection between different storage bins. At the most basic level, destination bin determination is required for nearly all stock moved in the warehouse. As used herein, warehouse and storage facility are used interchangeably, use of one or the other is not intended to limit generality. In certain instances it is also useful to perform destination bin determination as part of the planning process without requiring actual receipt of goods.

Figure 1:
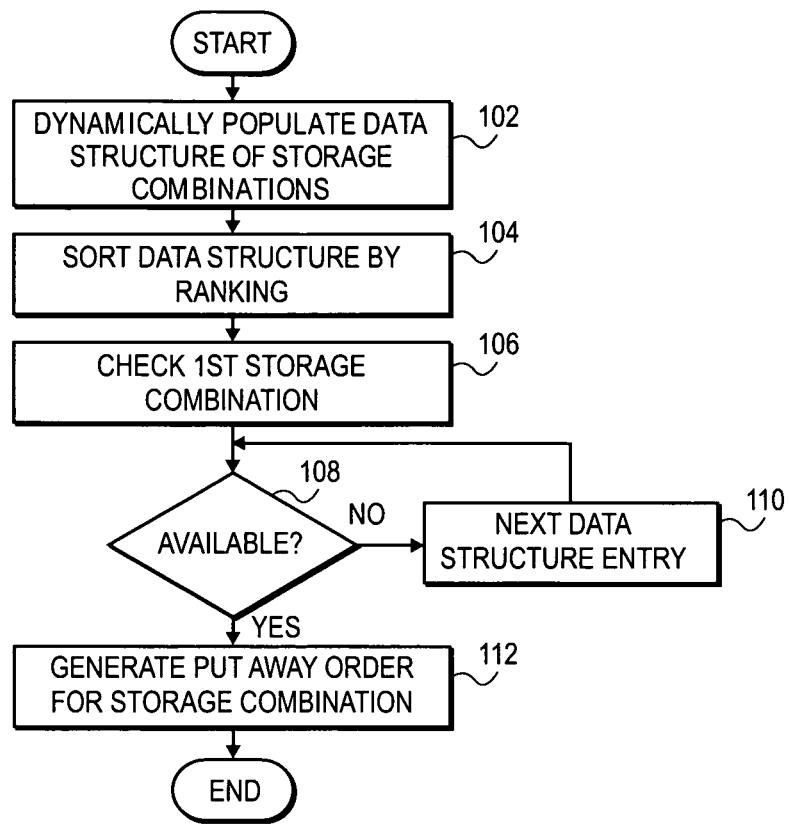
FIG. 1 is flow diagram of destination bin determination in one embodiment of the invention.

FIG. 1 is flow diagram of destination bin determination in one embodiment of the invention. At function block 102, a data structure is dynamically populated with storage combinations and associated rankings. By dynamically constructing the data structure each time, the system more readily adapts to changes in product attributes. In one embodiment, a storage combination includes storage type storage section and bin type as constituents.

At block 104, the data structure is sorted by ranking. In one embodiment, the rankings need not be sequential ordinal digits, but rather represent a relative distance from optimal. In one embodiment, the optimal storage combination is assigned a ranking of zero. In such an embodiment, the further a ranking is from zero, the less optimal the corresponding storage combinations.

At block 106, the check of the first storage combination (the optimal storage combination) is initiated. At decision block 108, a determination is made whether availability does exist. If not, the next entry in the data structure is checked for availability at block 110. An iteration of the data structure continues until availability is found at block 108. If availability is found, a put away order is generated for the storage combination having availability at block 112. In some embodiments, the put away order may be used as a transfer order (TO). In other embodiments, it may be used as a warehouse request (WR). As a practical matter, the put away order may be any document form reflecting the stock unit and the destination bin. As used herein, stock unit may, but need not refer to, an individual item of stock. Alternatively, stock unit may refer to a handling unit, such as a box, carton or pallet or any other grouping of stock.

FIGS. 2A-2C show an example of generation of a sorted data structure of storage combinations with ranks assigned. For purposes of this example, three storage types (ST), three storage sections (SS) and two bin types (BT) are assumed. However, the number of each constituent may be arbitrarily large. FIG. 2A schematically shows the notion that the increase ranking is associated with the transition between constituents on the same level. However, in one embodiment, the ranking is actually associated in persistent storage with the constituent itself.

As shown in FIG. 2A, a selection of storage type $ST_2$ instead of $ST_1$ results in a rank of 100. A selection of $ST_3$ instead of $ST_2$ results in an increase rank of 30. Thus, the total rank results from selection $ST_3$ instead of $ST_1$ is 130.

Similarly, selecting storage section $SS_2$ instead of $SS_1$ increases the rank by 25. A selection at $SS_3$ instead of $SS_2$ increases the rank by 50. Finally, selection of bin type $BT_2$ instead of $BT_1$ results in an increase in rank of 70.

In this example, as shown in FIG. 2B, there are eighteen possible storage combinations with ranks from 0 to 275. By sorting on the rank column, the table of FIG. 2C is achieved. By traversing this table in a top down manner, it is assured that first storage combination having availability will be the best available storage location for the stock at issue. The ranking of the storage location is the ranking that is associated with the stock. In one embodiment, the ranking represents a penalty for suboptimal storage. The higher the ranking, the lower the efficiency of using the storage combination for the particular stock. And, as discussed below, the greater the value of rearrangement stored in optimal bin become available.

Figure 3A:
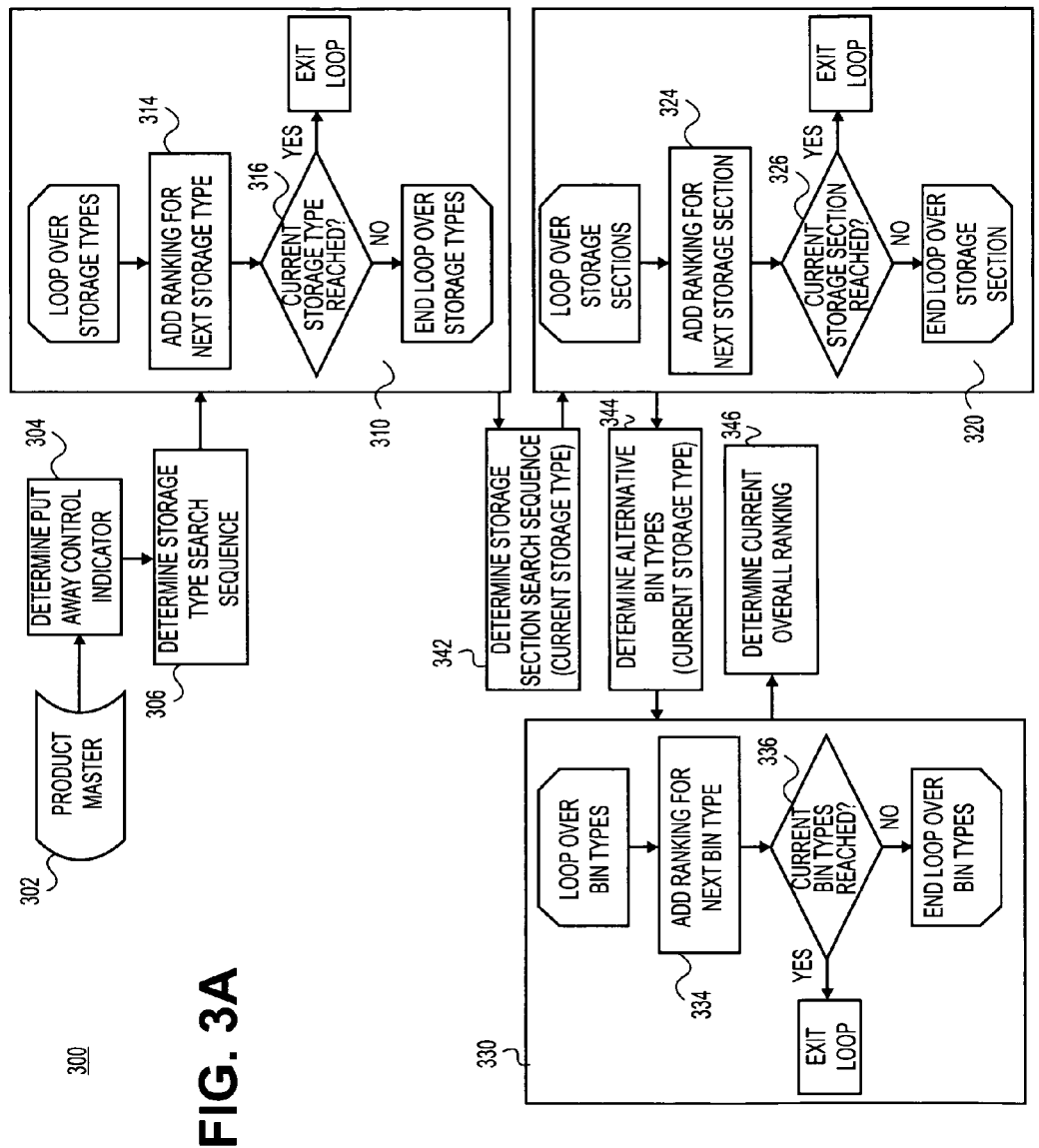
FIG. 3A is a flow diagram of ranking determination in one embodiment of the invention.

FIG. 3A is a flow diagram of ranking determination in one embodiment of the invention. FIG. 3B is an example of calculation of a stock ranking using persistent tables that may be stored in a database of one embodiment of the invention. Product master contains various key figures associated with a particular type of stock. Product master may include, for example, a put away control indicator. Typically, there will be a single put away control indicator per warehouse. However, in a multiple warehouse environment a product master 302 may include multiple put away control indicators. For example, these may be retained in database tables indexed by warehouse number. Product master also contains a reference to the optimal storage section and optimal bin type for the product. Product master 302 may additionally include global attributes that apply to the product regardless of a storage facility (warehouse) in which it is to be stored. Product master may also include local attributes or attributes linked to a particular storage facility.

At block 304, the control indicator at the storage facility at issue is determined. From the control indicator, the storage type search sequence is determined at block 306. The storage type search sequence may be stored in a persistent data structure. This data structure may include only a subset of all the storage types, those by ranking the size of the table dynamically created as described above with reference to FIG. 1. Referring to FIG. 3B, a storage type search sequence is ST1 and ST2 then ST3. As noted, this search sequence may be identified from a corresponding put away control indicator, which helps to locate appropriate database table in persistent memory. In some embodiments, there will be multiple storage type search sequences retained in persistent storage each corresponding to a product group or a set of product attributes.

Loop 310 reflects the looping over the storage type search sequence determined in block 306. The looping continues until a current storage type is reached at 316. Thus, again referring to FIG. 3B, if $ST_3$ were the current storage type, on the first pass through the loop the ranking calculated at 314 would be 0. On the second iteration of the loop it would be 7 and when the current $ST_3$ is reached, the ranking would be 12. At that point the loop would exit.

Then at block 342, a determination of the storage section sequence occurs. The current storage type acts as an index into the storage section sequence table contained in persistent storage as shown in FIG. 3B. At block 320, the system loops over a storage section sequence accumulating ranking at 324 until a current storage section is reached at 326.

At block 344, the current storage type is used in an index to identify alternative bin types available. At loop 330, system loops over bin types aggregating the ranking of the bin types until a current bin type is reached at decision block 336. The overall current ranking is determined at block 346 as the addition of the rankings corresponding to the constituents of the current storage combination. FIG. 3B provides one correct example of calculation of the overall current ranking.

Figure 4:
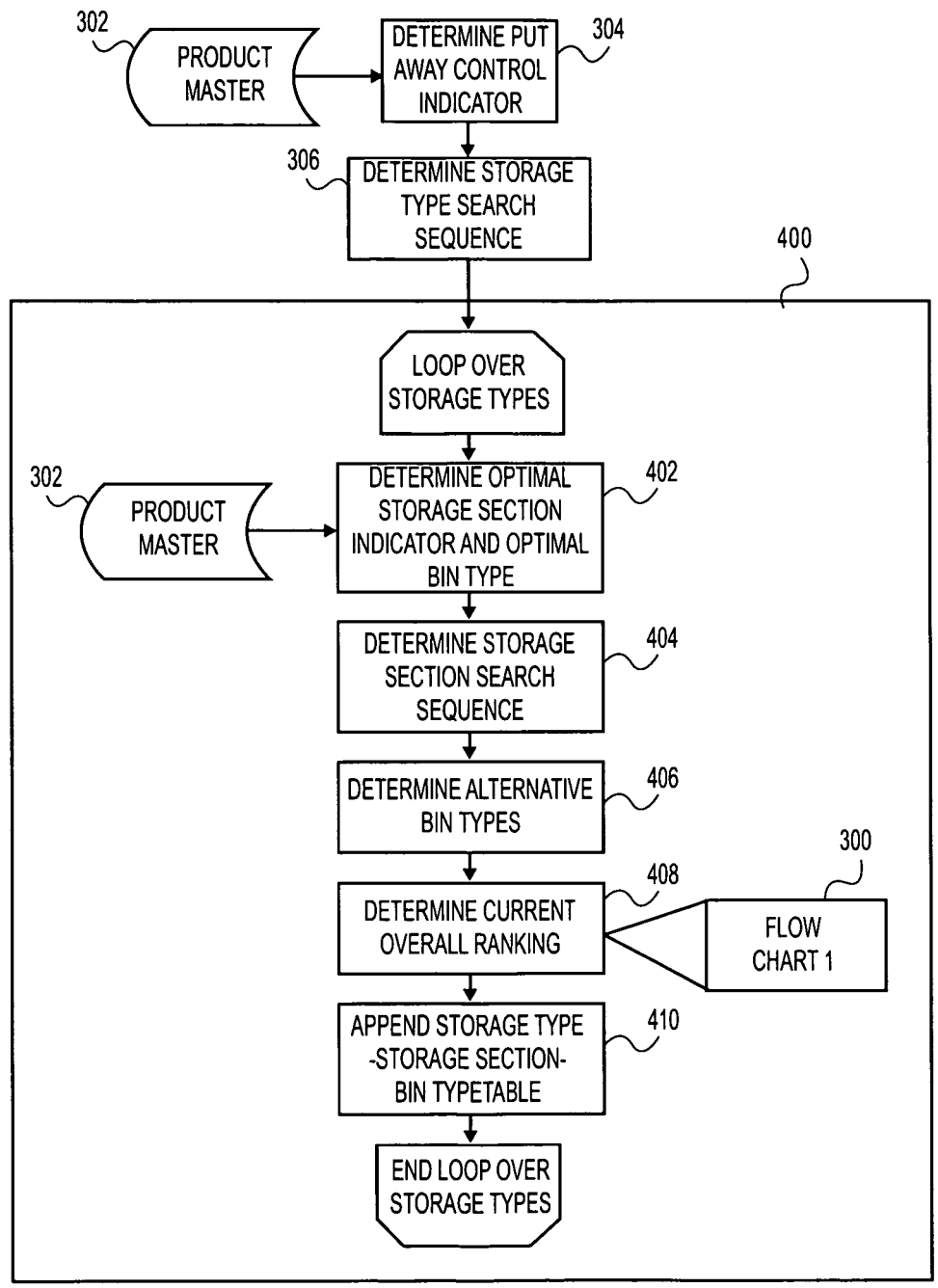
FIG. 4 is flow diagram of destination bin determination in one embodiment of the invention.

FIG. 4 is flow diagram of destination bin determination in one embodiment of the invention. Again, product master 302 may be used to provide data necessary for the bin determination, such as, for example, put away control indicator. Again at block 304, put away control indicator is determined from the product master. At block 306, the storage type search sequence is determined. Then in loop 400 dynamically creates the table that may be iterated to identify a best available storage bin. A determination is made what optimal storage section and optimal bin type is referenced in product master 302. A storage section search sequence is determined at block 404. In one embodiment, the storage type serves as an index into the storage section search sequence database table. Alternative bin types are determined at block 406. A current overall ranking is determined at block 408. This may be done as shown in FIG. 3A following flow 300. Then at block 410, the storage combination with the current ranking is added to the table.

Figure 5:
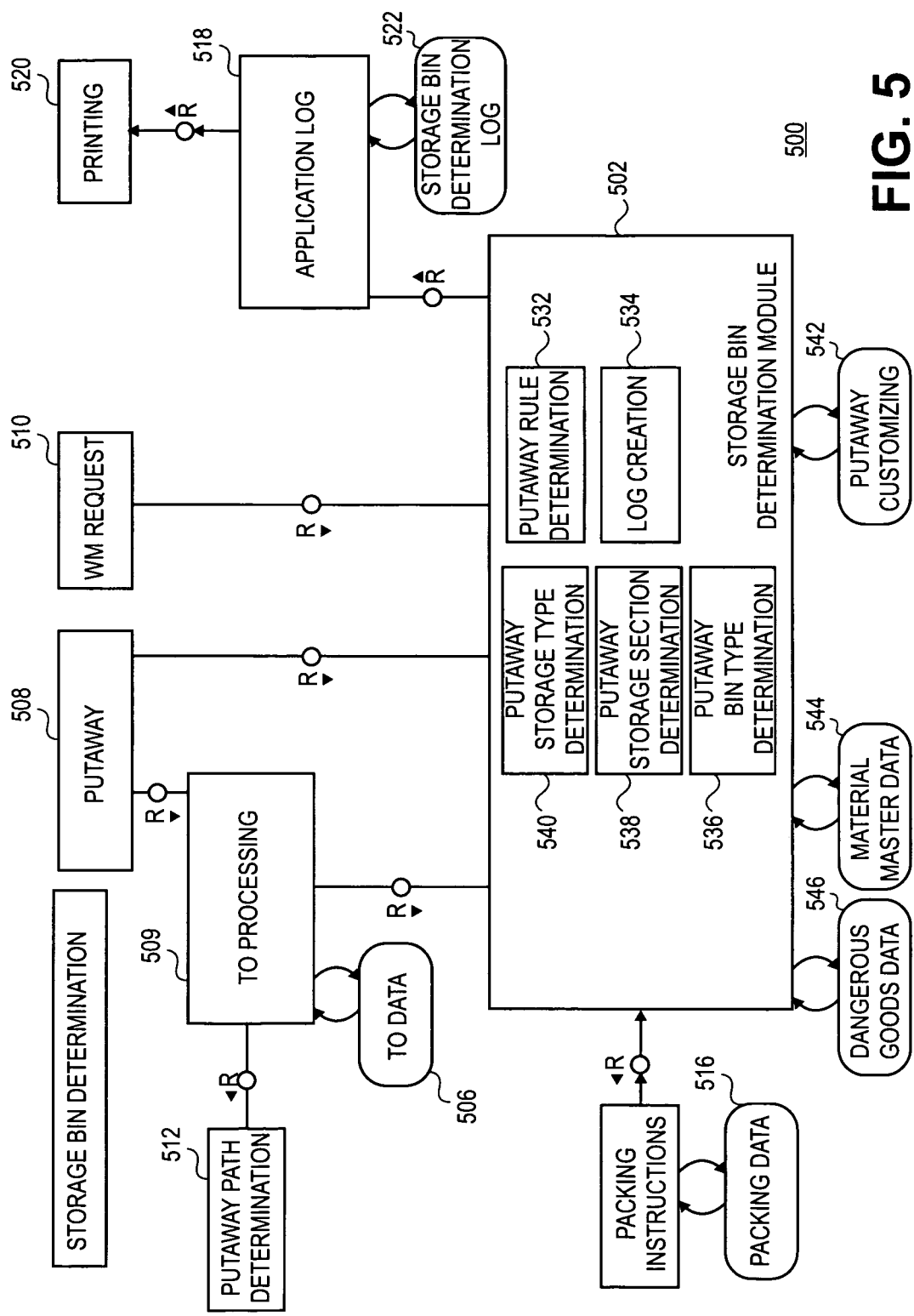
FIG. 5 is a fundamental modeling concepts diagram of destination storage bin determination.

FIG. 5 is a fundamental modeling concepts diagram of destination storage bin determination. System 500 includes a storage bin determination module 502, which relies on various data stores including put away customizing 542, material master data 544, and dangerous goods data 546 in performing its bin determination. Storage bin determination module 502 includes put away storage type determination agent 540, put away storage section determination agent 538, and put away bin type determination agent 536. These three agents collectively define the storage combination under which stock should be put away. Packing instructions agent 514 which uses packing data store 516 may also influence put away determination. Put away rule determination agent 532 which in storage bin determination module 502 may introduce rules, which influence storage type determination. This allows intelligence to be introduced into the put away bin determination process. Log creation agent 534 interacts with application log 518 in which the dynamically created table of storage combinations and rankings resides during a transaction. Application log 518 may request printing agent 520 to create a hard copy of one or more log file. Application log 518 uses storage bin log determination 522 as a data store.

Transfer order processing 504 uses transfer order data 506 for a persistent store. The put away agent 508 uses transfer order processing agent 504 and storage bin determination module 502 to identify a destination bin and create the relevant document to effect the stock transfer. Transfer order processing agent 504 uses put away path determination agent 512 to identify the appropriate put away path for the storage bin determined. Warehouse management (WM) request agent 510 receives advance notification of incoming stock and supplies needed data, such as product and quantity, to storage bin determination module to initiate the bin determination in the event of a delivery to the warehouse. The bin determination module 502 may be used by other processes within the warehouse management system.

A second warehouse process, which significantly benefits from the ranking scheme described above, is rearrangement. In a storage facility, each product is characterized by its demand, its packaging information, its attributes, e.g., warehouse product group, handling code, etc. Based on these parameters, optimal storage bins can be identified. However, during the life cycle of a product, these parameters may change. Particularly, demand may change. But other attributes, such as packaging data or master data attributes may also change. Such changes may lead to a change in the optimal storage bin. Moreover, in the event that the optimal bin was not available at the time the goods were received, it is possible that an optimal bin will subsequently be freed up and might therefore permit transfer of the stock from the suboptimal bin to the optimal bin.

Historically, rearrangement has been largely unsupported and performed, if at all, as a result of manual intervention. Prior systems make it difficult or impossible to identify appropriate candidates for rearrangement in an automated way. To optimize the space usage in the storage facility as well as optimize placement of products within the storage facility, the current stock situation may be analyzed to determine what rearrangements may improve the stock situation. In the real world, it is not possible to rearrange all stocks in optimal bins as a costs benefit analysis of such rearrangement yields a negative result. However, using the ranking system, it is possible to readily identify the rearrangements that will result in the highest benefit, such as improve picking speeds or reduced warehouse space. Thus, it may be possible to realize the lion's share of the rearrangement benefit at acceptable cost.

Figure 6:
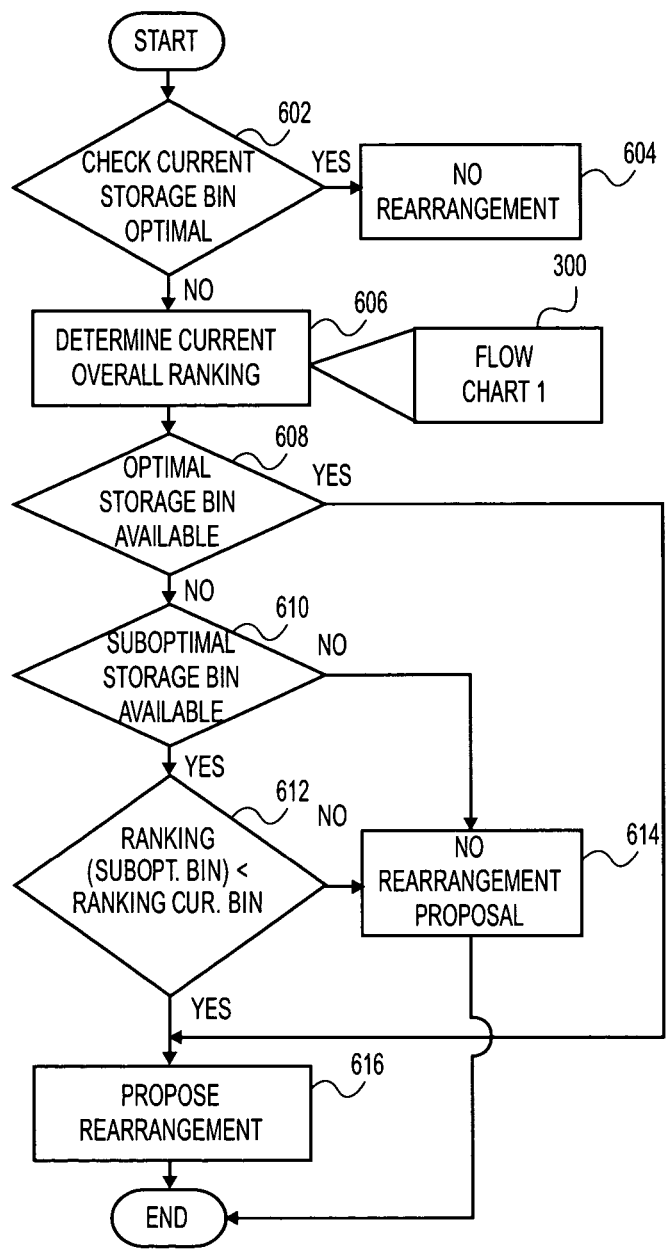
FIG. 6 is flow diagram of rearrangement in one embodiment of the invention.

FIG. 6 is flow diagram of rearrangement in one embodiment of the invention. At decision block 602, a determination made if the current storage bin is optimal. If it is, no rearrangement occurs at block 604.

Otherwise, a determination of the current overall ranking is performed at block 606. This may be performed following flow chart 300 of FIG. 3A. At decision block 608, a determination is made if an optimal storage bin is available. If it is, rearrangement is proposed at block 616. Proposed rearrangement may take the form display of the proposed rearrangement within graphical user interface, or even automatic generation of a transfer order. In one embodiment, the form of the proposal depends on a level of control a user wishes to exercise over the system.

If no optimal bin is available, a determination is made at block 610, if a suboptimal storage bin is available. If not, no rearrangement is proposed. If it is, a determination is made if the ranking value of the available suboptimal bin is less than the ranking value of the current bin. If it is, rearrangement may be proposed at block 616. If it is not, no rearrangement is proposed at block 614. Some embodiments of the invention use a threshold difference before rearrangement will be proposed. In some embodiments, this threshold may be set and/or adjusted by a user. In some embodiments, rearrangement can be executed in a batch mode. In such case, proposal may be transmitted as a batch report.

Figure 7:
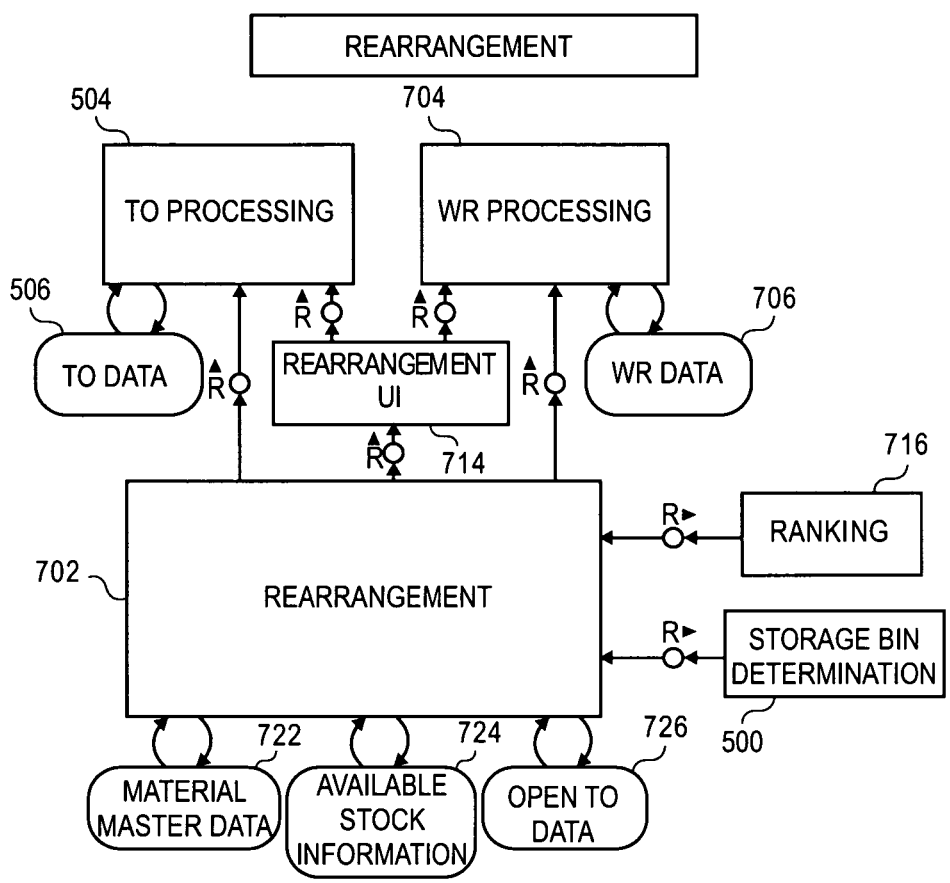
FIG. 7 is a fundamental modeling concepts diagram of rearrangement in one embodiment of the invention.

FIG. 7 is a fundamental modeling concepts diagram of rearrangement in one embodiment of the invention. Rearrangement agent 702 uses material master data 722, available stock information 724 and open transfer order data 726 to evaluate rearrangement opportunities within the storage facility. Rearrangement agent 702 also uses the storage bin determination 500 and ranking agent 716 to identify optimal bins and ranking information respectively for storage destination bins respectively. Rearrangement agent calls TO processing to create transfer orders in background or warehouse request (WR) processing 704 to create warehouse requests in background. The effect in both documents is approximately the same and either may generally be referred to herein as a "rearrangement order."

A rearrangement user interface (UI) 714 permits the user to create rearrangement orders in the foreground, using for example, a graphical user interface (GUI). In such case, where rearrangement is to occur in the foreground, a user may be displayed all possible rearrangements and then can select which rearrangements to perform. Alternatively, a subset of possible rearrangements yielding the greatest benefit may be displayed. In one embodiment, by clicking on the proposed rearrangement in the GUI, a corresponding rearrangement order is automatically created.

While embodiments of the invention are discussed above in the context of flow diagrams reflecting a particular linear order, this is for convenience only. In some cases, various operations may be performed in a different order than shown or various operations may occur in parallel. It should also be recognized that some operations described with respect to one embodiment may be advantageously incorporated into another embodiment. Such incorporation is expressly contemplated.

Elements of embodiments of the present invention may also be provided as a machine-readable medium for storing the machine-executable instructions. The machine-readable medium may include, but is not limited to, flash memory, optical disks, compact disks read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A computer implemented method comprising:
   retaining a ranking value for each constituent of a plurality of storage combinations in a persistent storage of a computer, the ranking value relative to at least one type of stock;
   ordering a search for availability of the storage combinations from a most favorable rank to a least favorable rank; and
   identifying a best available storage combination for a unit of stock.

2. The method of claim 1 further comprising:
   comparing the ranking of the best available storage combination to the ranking of a current storage combination; and
   generating a rearrangement proposal responsive to a difference in the rankings.

3. The method of claim 1 further comprising:
   changing the ranking responsive to changes in a characteristic of the stock.

4. The method of claim 1 wherein ordering comprises:
   dynamically creating a data structure of storage combinations augmented with an aggregate ranking of the constituents;
   sorting the data structure based on the rankings; and
   traversing the data structure from most favorable rank to least favorable rank until availability is found.

5. The method of claim 1 further comprising:
comparing for each of a plurality of stock units a ranking of a best available storage combination with a current storage combination;
identifying at least one stock unit with a difference in the comparison; and
generating a rearrangement proposal for that stock unit.

6. The method of claim 1 wherein retaining comprises:
retaining in the persistent storage a value for each storage type, a value for each storage section and a value for each bin type in a storage facility.

7. A computer readable storage media containing executable computer program instructions which when executed cause a digital processing system to:
retain a ranking value for constituents of a plurality of storage combinations in a persistent storage the ranking value relative to at least one type of stock;
order a search for availability of the storage combinations from a most favorable rank to at least favorable rank; and
identify a best available storage combination for a unit of stock.

8. The computer readable storage media of claim 7 containing executable computer program instructions which when executed further cause a digital processing system to:
compare the ranking of the best available storage combination to the ranking of a current storage combination; and
generate a rearrangement proposal responsive to a difference in the rankings.

9. The computer readable storage media of claim 7 containing executable computer program instructions which when executed further cause a digital processing system to:
change the ranking responsive to changes in a characteristic of the stock.

10. The computer readable storage media of claim 7 containing executable computer program instructions which when executed further cause a digital processing system to:
dynamically create a data structure of storage combinations augmented with an aggregate ranking of the constituents;
sort the data structure based on the rankings; and
traverse the data structure from most favorable rank to least favorable rank until availability is found.

11. The computer readable storage media of claim 7 containing executable computer program instructions which when executed further cause a digital processing system to:
compare for each of a plurality of stock units a ranking of a best available storage combination with a current storage combination;
identify at least one stock unit with a difference from the comparison; and
generate a rearrangement proposal for that stock unit.

12. The computer readable storage media of claim 7 wherein instructions causing the system to retain comprise instructions which when executed cause a digital processing system to:
retain in the persistent storage a value for each storage type, a value for each storage section and a value for each bin type in a storage facility.

13. A system comprising:
means for identifying a best available storage combination for a unit of stock within a plural bin facility, the means for identifying including means for ranking a storage combination based on relative optimality and means for comparing a best available storage combination ranking with a current storage combination ranking;
means for generating a put away order document for the unit of stock to the best available storage combination; and
means for generating a rearrangement proposal for suboptimally stored stock.

* * * * *